United States Patent [19]

Holman

[11] 4,091,153
[45] May 23, 1978

[54] ARTIFICIAL BOARDS AND SHAPES

[76] Inventor: John A. Holman, 1206 Rutledge Way, Anderson, S.C. 29621

[21] Appl. No.: 562,358

[22] Filed: Mar. 26, 1975

Related U.S. Application Data

[62] Division of Ser. No. 321,153, Jan. 5, 1973, Pat. No. 3,890,077.

[51] Int. Cl.$^2$ ............................................. B29C 15/00
[52] U.S. Cl. ................................... 428/114; 428/141; 428/218; 428/294; 428/292; 428/436; 428/537; 264/109; 264/229; 264/277
[58] Field of Search ............... 428/218, 292, 293, 294, 428/114, 106, 436, 107, 537, 110, 141, 295, 529, 528, 541, 511, 194; 264/174, 271, 277, 275, 261, 229, 231, 109

[56] References Cited

U.S. PATENT DOCUMENTS

| 2,653,090 | 9/1953 | Crandall | 428/293 X |
|---|---|---|---|
| 2,717,420 | 9/1955 | Roy | 264/119 |
| 2,847,733 | 8/1958 | Roy | 428/114 |
| 3,159,526 | 12/1964 | Hartesveldt et al. | 428/218 |
| 3,185,614 | 5/1965 | Hartesveldt et al. | 428/218 |
| 3,556,922 | 1/1971 | Green et al. | 428/902 |
| 3,652,377 | 3/1972 | Helmick | 428/218 |
| 3,791,912 | 2/1974 | Allard | 428/294 |

FOREIGN PATENT DOCUMENTS

| 1,012,748 | 7/1957 | Germany | 428/294 |

Primary Examiner—Ralph S. Kendall
Attorney, Agent, or Firm—Bailey, Dority & Flint

[57] ABSTRACT

A method and apparatus for producing elongated boards of artificial lumber reinforced with elongated reinforcing members providing strength thereto. The boards are constructed of any suitable filler material such as ligneous fibers mixed with thermosetting resin. The mixture of fibers and resin are pulled into a compression chamber by a plurality of elongated belts while the reinforcing strands are fed thereto. The belts are rotated to compress the mixture about the strands while the strands are under tension or undulated. Then the mixture is fed through a curing chamber for curing.

6 Claims, 10 Drawing Figures

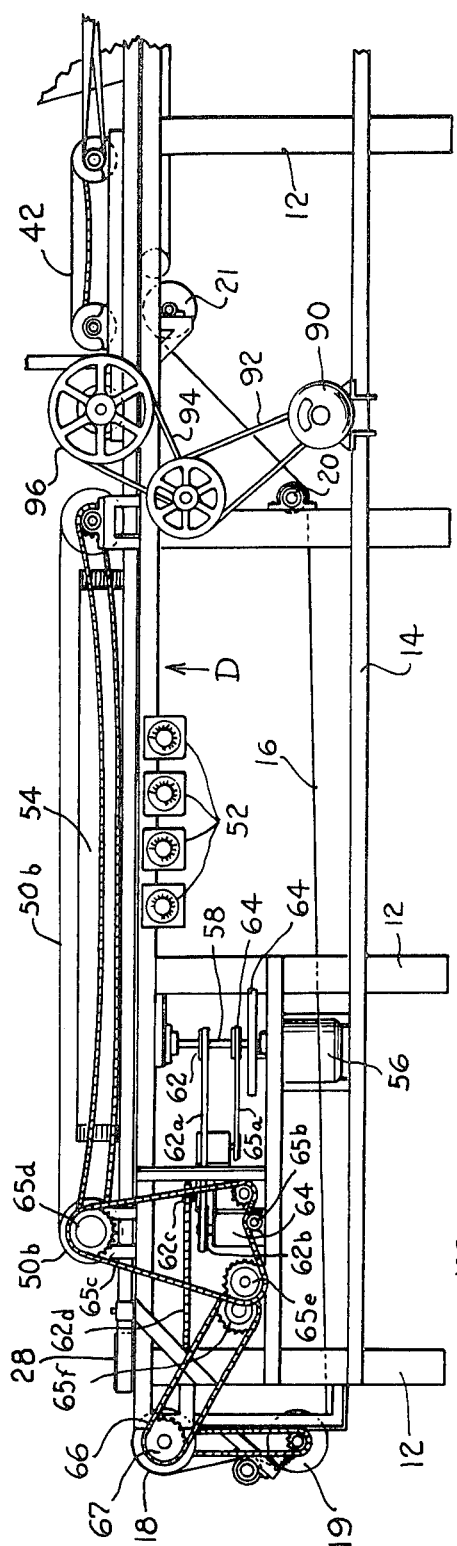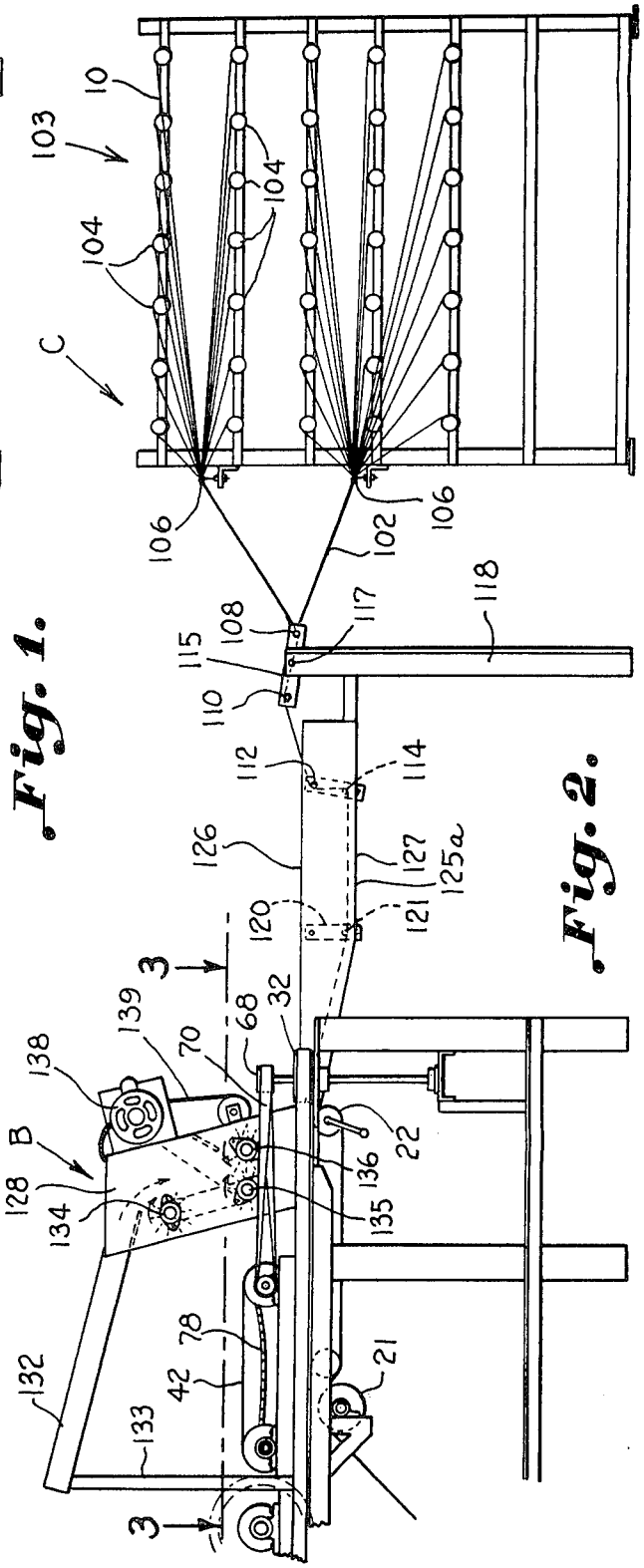

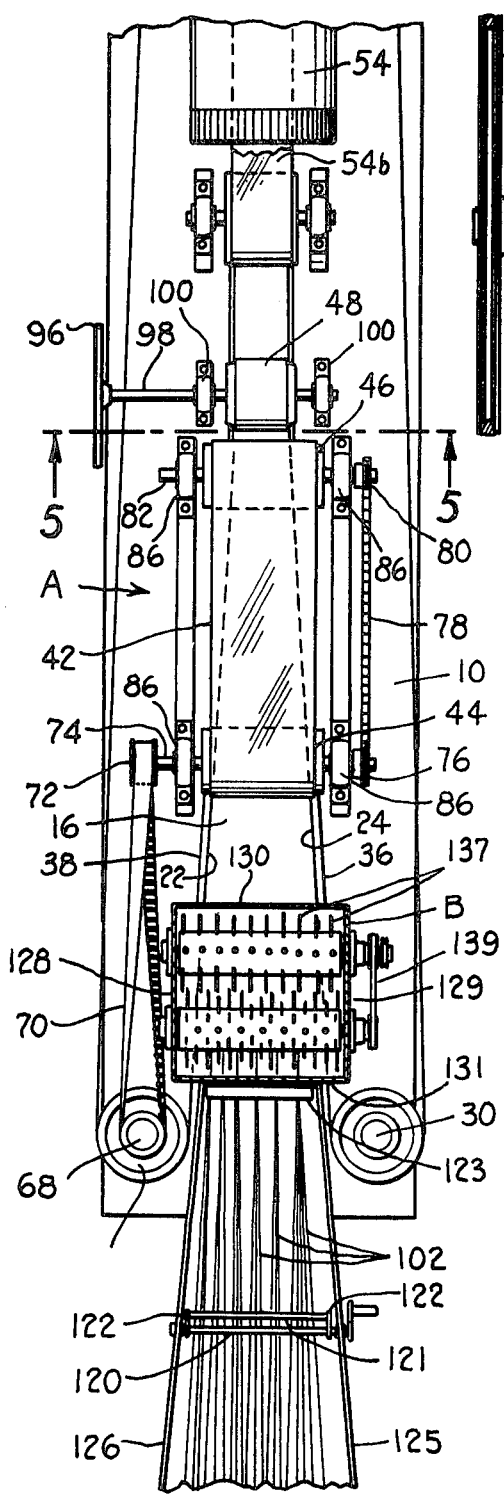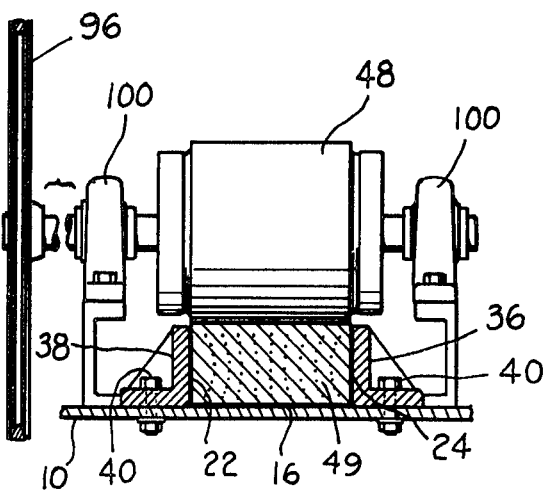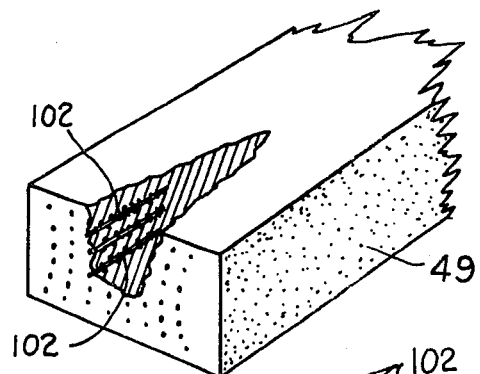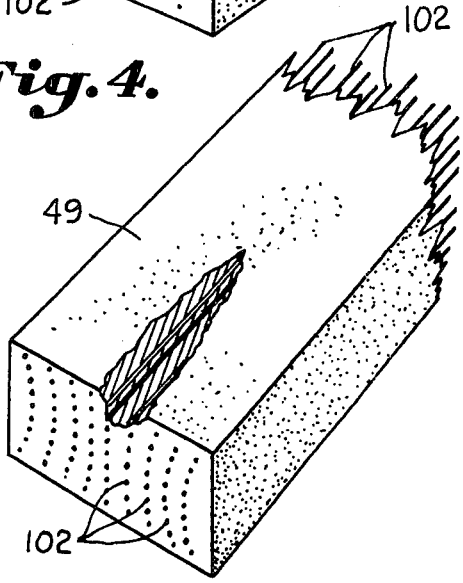
Fig. 3.
Fig. 5.
Fig. 4.
Fig. 6.

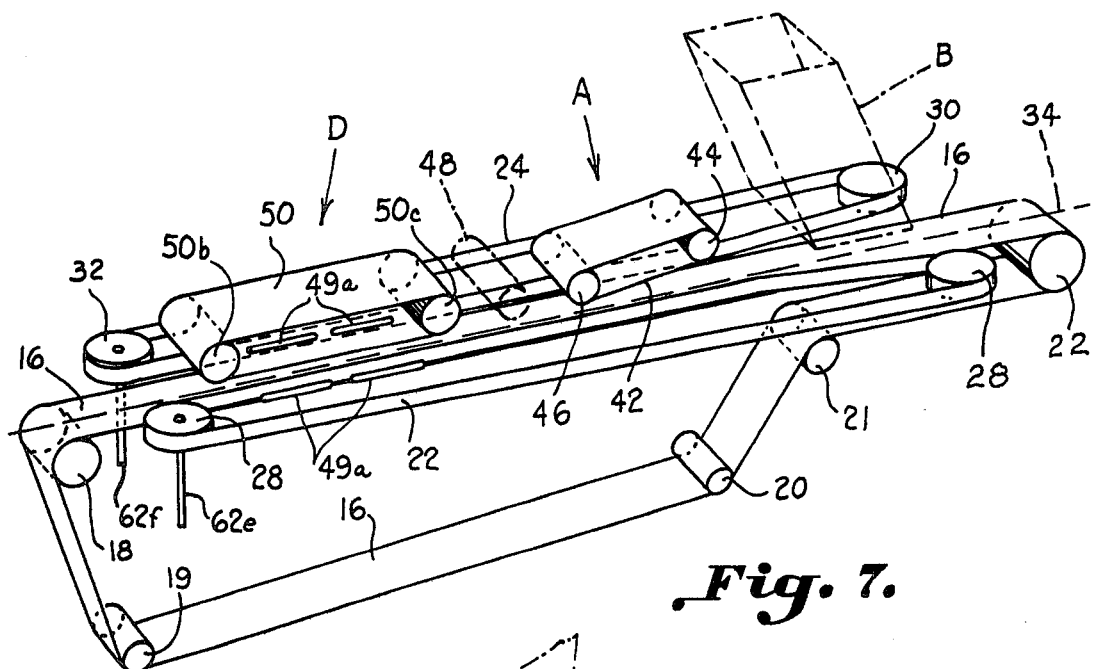
Fig. 7.
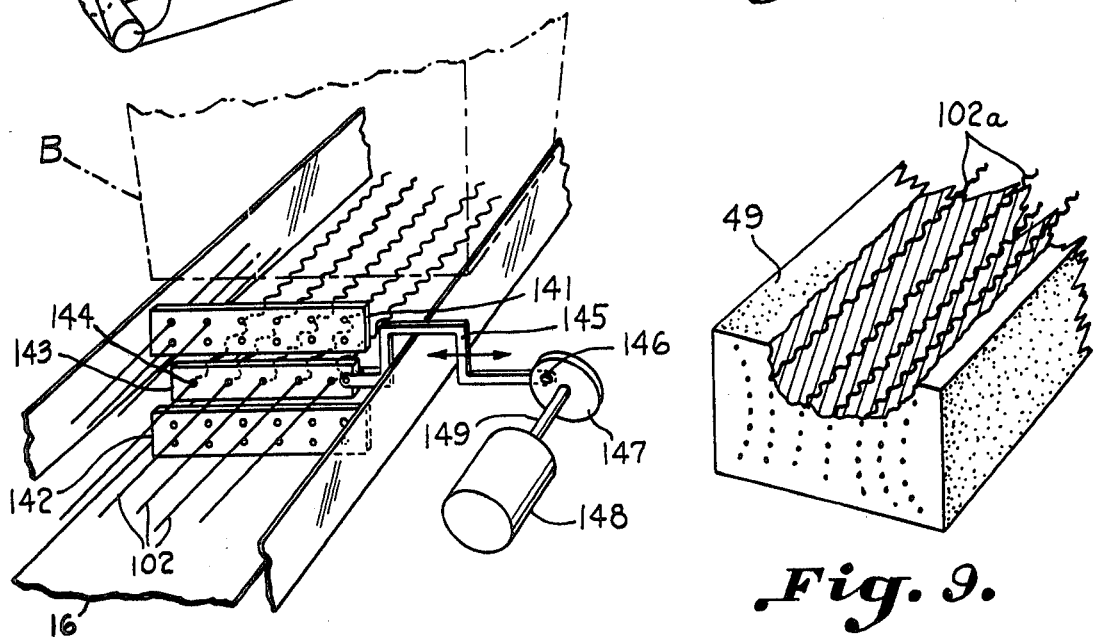
Fig. 8.
Fig. 9.
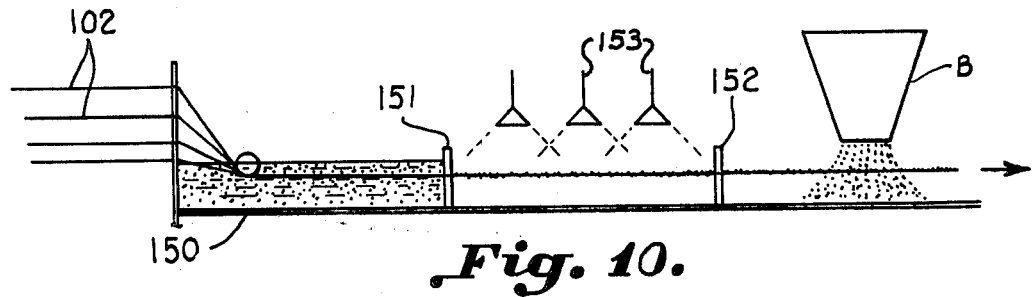
Fig. 10.

ARTIFICIAL BOARDS AND SHAPES

This is a division of application Ser. No. 321,153, filed Jan. 5, 1973, now U.S. Pat. No. 3,890,077.

This invention relates to a method and apparatus for producing elongated boards of artificial lumber and more particularly to a method and apparatus for pulling a mixture, which is compressed about elongated reinforcing strands, through a curing chamber.

Heretofore many attempts have been made to produce compressed boards from various materials such as ligneous fibers mixed with a bonding agent, however, it has been difficult to obtain a breaking strength similar to that of high grade lumber. An attempt to reinforce the artificial lumber with reinforcing members is disclosed in U.S. Pat. Nos. 2,717,420 and 2,847,733. As a result of the mixture being ram extruded, segmented, compressed portions are produced with the strength of the material at the gaps between the segmented compressed sections being less than the strength at other points on the surface of the material that is compressed.

Another method of manufacturing fibrous extrusions is illustrated in U.S. Pat. No. 2,648,262 which discloses an apparatus for the manufacture of fibre board by use of a reciprocating ram. As can be seen these boards are not reinforced and therefore do not possess the strength of a board constructed of similar material reinforced with elongated reinforcement strands.

Accordingly, it is an important object of the present invention to provide an apparatus for constructing elongated boards of artificial lumber which are reinforced with elongated strands extending the length of the lumber.

Another important object of the present invention is to provide an apparatus for drawing and compressing fibrous material into desired shapes while reinforcing the shape with elongated strands of fibrous material.

Still another important object of the present invention is to provide an elongated board constructed in accordance with the present invention with reinforcing strands which are oriented in predetermined patterns to add strength thereto.

Still another important object of the present invention is to provide an apparatus for producing elongated artificial boards which have strands extending therethrough that were texturized prior to forming the boards with such therein.

Still another important object of the present invention is to provide a method of constructing an artificial board of any desired length which is reinforced with reinforcing strands and has a substantially uniform density about its length.

Still another important object of the present invention is to provide a method of reinforcing elongated artificial boards with reinforcing members which are under tension.

Still another important object of the present invention is to provide a method of compressing material by use of elongated belts into a desired length while reinforcing strands are fed thereto.

Still another important object of the present invention is to provide a simple and economical method and apparatus for constructing artificial boards having a cost comparable with natural lumber.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIGS. 1 and 2 is a side elevational view illustrating an apparatus for manufacturing artificial lumber, FIG. 3 is an enlarged plan view taken along lines 3—3 of FIG. 2, FIG. 4 is a sectional view taken along line 4—4 of FIG. 3 illustrating a mixture being compressed into artificial lumber, FIG. 5 is a large perspective view with parts broken away illustrating a modified form of a board constructed in accordance with the present invention, FIG. 6 is a perspective view with parts broken away illustrating a portion of the artificial lumber manufactured in accordance with the present invention, FIG. 7 is a partially diagrammatic perspective view illustrating the arrangements of the belts utilized for compressing and pulling the artificial lumber through a compression member and curing chamber, FIG. 8 is a fragmentary perspective view illustrating a modified form of the invention wherein reinforcing fibers are reciprocally shifted laterally prior to compressing with the mixture to form the artificial board, FIG. 9 is a perspective view illustrating another modified form of the invention wherein the board is reinforced with undulated elongated strands, and FIG. 10 is a modified form of the invention wherein elongated strands are texturized prior to being fed into the compressing and curing members.

Referring in more detail to the drawings there is illustrated an apparatus for producing elongated boards of artificial lumber and shapes from a mixture of fibers and a heat activated binder reinforced with elongated reinforcing members. A plurality of endless belts are radially spaced about a longitudinal axis. Rotatable members support each of the belts in an extended loop with the belts being positioned about the longitudinal axis so that an inner surface of each of the belts cooperate to define an elongated forming die A with an entrance opening at one end and an exit opening at the other end. A hopper means B is provided for supplying the mixture of ligneous fibers and resin to the entrance of the elongated forming die A. Means C is provided for feeding elongated reinforcing members to the elongated forming die A. Heaters are carried closely adjacent an inner surface of the belts for curing the mixture as such passes through an elongated curing chamber D. Means is provided for rotating the belts defining the forming and curing dies A and D for pulling the mixture and the elongated reinforcing members through the elongated dies forming an elongated reinforced cured artificial board. Means is also provided for placing said elongated reinforcing members under tension as said mixture and reinforcing members are pulled through said forming die A.

Referring in more detail to FIGS. 1, 2 and 3 of the drawings there is illustrated an apparatus for producing elongated boards of artificial lumber. The apparatus is supported on a bed 10 of an elongated metal table. The bed 10 of the table is supported on vertical posts 12 spaced longitudinally thereunder. Suitable elongated bracing such as horizontal angle irons are provided for adding rigidity to the table.

The mixture which is used to form the elongated board is fed into a hopper means B and deposited on an elongated bottom belt 16. This bottom belt 16 is constructed of steel and extends substantially the full length of the table 10 and passes under the hopper B for receiving the mixture therefrom. The belt 16 is provided for rotating on the rollers 18, 19, 20, 21 and 22 as illustrated in FIG. 6 of the drawings. The portion of the belt between roller 22 and roller 18 is carried above the bed of the table and in some particular embodiments a bearing means is provided between the belt and the surface of the table. These bearing means may include roller bearings or in some particular instances a low friction plastic material such as nylon strips. Such are not illustrated for purposes of clarity. Positioned closely adjacent the bottom belt 16 are a pair of spaced side belts 22 and 24 respectively. The side belts 22 extends around rollers 26 and 28 carried adjacent opposite ends of the elongated table and on one side of the hopper B. The elongated belt 24 is carried on the opposite side of hopper B closely adjacent the bottom belt 16 and extends around rollers 30 and 32. It is noted that the forward end portions of the belts 22 and 24 converge inwardly towards a longitudinal axis 34 extending through the curing die A. Angle iron members are provided for guiding the belt in the converging manner. After the belts converge so that the distance between the inner surfaces of belts 22 and 24 reaches a predetermined distance then the belts extend rearwardly parallel to the longitudinal axis 34 until they reach the rear rollers 28 and 32. As shown in FIG. 4 angle irons such as shown at 36 and 38 are bolted to the table 10 with bolts 40 for guiding the direction of the side belts 22 and 24.

In order to compress the material being fed from the hopper B in the forming die an upper belt 42 is carried directly above the side belts 22 and 24 and the bottom belt 16. The forward end of the upper belt is carried on a roller 44 with the rear end extending around a roller 46. Roller 44 is positioned slightly higher than roll 46 so that the belt 42 extends downwardly towards the longitudinal axis of the forming die.

The forming die A is defined by the inner surfaces of the upper belt 42, side belts 22 and 24 and bottom belt 16. As the material is being fed through the hopper B onto the bottom belt 16 it is pulled through the forming die A by the rotation of the belts 16, 22, 24 and 42 so as to be compressed to a predetermined height and width such as illustrated in FIGS. 3 and 4.

Positioned directly ahead of the top belt 42 is a speed roll 48 which is rotated at a much higher speed than the belts being used to compress the material so as to place a polished, finished surface on the compressed member. In some instances the speed roll 48 is used to further compress the mixture for placing a desired configuration on the surface that it is engaging. The compressed board 49 is then pulled through a curing chamber D which is defined by an elongated upper belt 50, the bottom belt 16 and the two side belts 22 and 24 respectively. Heaters 49a are carried adjacent the inner surface of each of the belts 22, 24, 16 and 50 for applying heat to the compressed mixture being pulled therethrough for curing the thermosetting resin to solidify the board. The curing chamber D may be of any desired length depending on the speed that the apparatus is being operated. Of course if it is desired to operate the apparatus at a higher rate of speed then it would be necessary to make the curing chamber D much longer so that the resinous material will be in contact with heat for the desired length of time. Suitable controls 52 are provided for controlling the heat of the heating elements carried under the insulated cover 54 shown in FIG. 1.

All of the elongated steel belts are driven from a single drive motor 56 (FIG. 1). The drive motor 56 is coupled to a vertical shaft 58 by means of a chain extending around pulley 60. Two small output pulleys 62 and 64 are carried on the shaft 58. Extending around the pulleys 62 and 64 are elongated chains which also extend around the pulleys of a gearbox 64a. The chain 62a is coupled to an input pulley 62b which drives a vertical output shaft 62c of the gearbox 64. The vertical output shaft 62c in turn has wrapped therearound a chain 62d which is coupled to the shafts 62e and 62f upon which the rollers 28 and 32 are carried. All of the pulleys are not illustrated for purposes of clarity. It is to be understood of course, that the rollers 28 and 32 are driven from the gearbox 64 at the same rate of speed as the other chains used on the apparatus. Chain 65a which is coupled to pulley 64 is used to drive the input shaft of the gearbox which in turn rotates the horizontal output shaft 65b. The horizontal output shaft 65b in turn is coupled to a chain 65c which extends around pulleys 65d and 65e. Pulley 65d is carried on the end of the same shaft that drum 50b is carried for driving the belt 50. The sprocket 65e is carried on a shaft which in turn has a gear arrangement (not shown) provided thereon for driving a sprocket 65f. Extending around sprocket 65f is a chain 66 that is used for driving the pulley 67 carried on the same shaft upon which roller 18 is provided. This in turn drives the elongated belt 16.

The power for driving the top belt 42 is derived from the vertical shaft 68 upon which the roll 32 is carried. The roller 32 is rotated when the side belt 22 is driven in turn causing a gearbelt 70 which is carried on the same shaft 68 to be driven. The other end of the gearbelt 70 is carried on a pulley 72. The pulley 72 is carried on shaft 74 upon which roller 44 is carried for rotating the roller 44 and in turn the top belt 42. Keyed to the other end of the shaft 74 is a sprocket 76 upon which a chain 78 extends to drive roller 46 through a sprocket 80 carried on the end of shaft 82. The shafts 82 and 74 are suitably journalled in bearing blocks 86. All of the shafts upon which the belts 22, 24, 16, 50 and 42 extend around are journalled in similar bearing blocks and such are not disclosed and described for purposes of clarity.

Forming die A includes side belts 22, 24, a bottom belt 16 and top belt 42. From viewing FIGS. 3 and 6 it can be seen that the side belts converge inwardly towards a longitudinal axis 34. The top belt 42 also converges rearwardly towards the longitudinal axis 34. As the material, which is generally a filler material, and a binder is dispensed from the hopper B onto the bottom belt 16 it is fed through forming die A to be compressed by the belts 42, 22, 24 and 16 to the desired cross-section. When the compressed board leaves the trailing roller 46 around which the belt 42 is carried it then passes under a speed roller 48 which is driven by electric motor 90. An output shaft of electric motor 90 is coupled through belts 92 and 94 to a pulley 96 carried on the shaft 98 upon which the speed roll 48 rides. The shaft 98 is suitably journalled in bearing blocks 100. The speed roll 48 which operates at a much higher speed than the speed that the belts pulling material through the forming die A and curing chamber D operate places a final shaped polished surface on the artificial lumber being formed.

Elongated reinforcing fiberglass strands 102 are carried on a creel 103 having a plurality of packages 104 rotatably carried on horizontal frame members 106. The strands are fed off the individual packages 104 through guides 106 around a pair of spaced rods 108 and 110. The purpose of the space rods is to impart tension on the strands as they are pulled through the forming die A and curing chamber D during the manufacture of the artificial lumber. The strands 102 as illustrated in FIG. 2 are fed under rod 108, over rod 110 around rod 112 and back under rod 114. The rods 108, 110, 112 and 114 are carried between spaced brackets 115 and 116 respectively. By rotating these brackets the frictional contact caused by the strands 102 passing around the rods can be varied. The bracket 115 is allowed to rotate about pin 117 which is suitably supported on spaced upper angle iron members 118. The fiberglass strands 102 then pass under another guide member 120 which has a transverse rod 121 carried between the space members 122. The strands 102 then pass through a die 123 which has holes extending therethrough for maintaining the strands separated according to a predetermined pattern as the reinforcing strands 102 pass beneath the hopper B. In order to form the pattern shown in FIG. 4 of the drawing which simulates woodgrain the die 123 positioned in front of the hopper has a plurality of aligned horizontal and vertical holes extending therethrough through which the strands 102 extend. The arcuate shape of the pattern of each column of strands 102 shown in FIG. 4 is produced when the mixture is compressed in the compression member A.

It is noted that the restraining members 116 and 120 are carried within an elongated receptacle 125a defined by converging side walls 125 and 126 which are connected by a bottom 127. Resin is carried within this receptacle 125c for coating the fiberglass strands 102 as they pass therethrough for enhancing the bonding between the fiberglass strands and the mixture being fed through the hopper B.

The hopper B is rectangular shaped and includes vertical side walls 128 and 129 which are joined by end walls 130 and 131. A trough 132 (not shown is FIG. 3 for purpose of clarity) is carried adjacent the top of the hopper for feeding a mixture into the hopper. The upper end of the trough is supported by vertical angle irons 133. Rollers 134, 135 and 136 are carried between the side walls 128 and 129 of the hopper for being rotated to throw the mixture between the spaced strands 102 of fiberglass. The upper roller 134 is rotated to feed the mixture from the trough 132 downwardly towards the two lower rollers 135 and 136. The rollers 135 and 136 are rotated in opposite directions to engage the mixture and throw such between the fiberglass strands. Positioned on the rollers 134, 135 and 136 are outwardly extending pins which engage the mixture to move such through the hopper. The pins on the lower rollers 135 and 136 are aligned in a predetermined pattern so that they are circumferentially spaced around the rollers 135 and 136 in rows that intersect between the strands extending through the die 123 below the hopper B so as to pack the mixture between the fiberglass strands 102.

An electric motor 138 is provided for driving the three rollers 134, 135 and 136 by means of a belt 139 extending around pulleys carried on the ends of the shafts which support the rollers 134, 135 and 136.

One suitable mixture that can be placed in the hopper for being compressed around the elongated fibers 102 consists of the following formulation by weight.

| | |
|---|---|
| Pine or Oak wood fibers - medium fine - 1/16 to 5/8" long 18 to 20 hundredth of an inch thick | 32.5% |
| Pine or Oak wood fiber - fiberized - .15 to 3/4" long | 3.25% |
| Pine or Oak wood flour - 95% passes through a 60 mesh screen | 7.4% |
| Bonding resin - thermosetting polyester | 6.4% |
| Fire retardant powder - aluminum hydrate | 3.25% |
| Urea resin - 60% solids | 44.0% |
| Wax - Microcrystalin paraffin emulsion 60% solids (aids in making board water resistant) | 3.2% |
| Reinforcing members - fiberglass strands | .12 lbs./ft. |
| Bonding resin for coating reinforcing members Orthophthalic polyester resin - 50% base alkyd | .24 lbs./ft. |

It is to be understood that many variations of the above formulation may be utilized and it is contemplated that waste materials such as sawdust, wood fibers, processed garbage, trash and many other items which can be bonded under heat and pressure with a thermosetting resin may be utilized. Also many suitable additives may be included in the mixture for repelling termites, making the board fire-resistant, water resistant, and conditioned against other environmental conditions.

In summarizing the method and apparatus for producing artificial lumber utilizing the apparatus as disclosed in FIGS. 1, 2, 3, 4 and 7 first the elongated fiberglass strands 102 are threaded from the creel 103 around the restraining members 115 and 116 through a resinous material carried in the receptable 125a that in one particular embodiment is an orthophthalic polyester resin having a 50% base of alkyd. As the elongated strands are fed through the receptacle 125a the resinous material is coated on the strands 102. The strands 102 then pass through a die 123 to be oriented in horizontal rows and vertical columns. As the elongated strands pass under the hopper B the mixture of ligneous material is thrown between these strands onto the bottom belt 16. Of course at this time all of the belts forming part of the apparatus are rotating at the same rate of speed since they are all driven from the drive motor 56. As the mixture is placed on the bottom belt 16 the converging side belts 22 and 24 begin compressing the mixture. The mixture then passes under the top belt 42 which is rotating in the same direction as the two side belts 22 and 24 and the bottom belt 16. The inner surface of the top belt 42 as well as the inner surface of the side belts 22 and 24 all converge towards the longitudinal axis extending through the forming die A defined by the belts. As the mixture is pulled through the compression chamber A by the belts 16, 22, 24, and 42 such is compressed. Due to the action of the side belts 22 and 24 compressing the mixture from the sides the fiberglass strands which originally started out in columns are compressed into arcuate columns similar to the grain of wood such as illustrated in FIG. 4. These curved oriented columns of fiberglass strands 102 increase the strength of the wood product.

As the compressed mixture passes under roll 46 it has completed the compression and the speed roll 48 which is rotating at a much higher rate of speed polishes the upper surface of the material. The material is then fed under the curing chamber D by the side belts 22 and 24, bottom belt 16 and a top belt 50. As previously mentioned, elongated heating elements are carried closely adjacent the inner surfaces of the elongated belts for curing the compressed board as it passes through the curing chamber D. Since the mixture is being pulled or drawn by the belts 22, 24, 16, 42 and 50 and the restraining members 116 and 115 frictionally engage the strands 102 passing therearound the elongated strands 102 are placed in tension. In one particular embodiment two hundred pounds of tension is applied to the strands being fed into the mixture. By placing the strands under tension the strength of the wood is substantially increased.

FIG. 8 illustrates a modified form of the invention when instead of aligning the elongated strands 102 by means of a die having aligned vertical and horizontal holes extending therethrough for separating the strands the die is constructed of three pieces. The upper and lower members 141 and 142 respectively are rectangular in shape and have rows of aligned holes provided therein through which the elongated strands extend. These members 141 and 142 are fixed closely adjacent the entrance of the hopper B by means not shown for purposes of clarity. Sandwiched between the two members 141 and 142 is a central member 143 that has spaced holes 144 extending therethrough. By reciprocally moving the central member 143 back and forth as the fibers are being drawn under the hopper D a sinusoidal pattern is applied to the central strands 102 compressed in the board. This adds considerable strength to the board. The fibers that pass through the upper and lower members 141 and 142 would be oriented in the same way as the upper and lower fibers illustrated in FIGS. 4 and 6. The mechanism for reciprocating the central member 143 back and forth includes a linkage of 145 which has one end pivotally attached to the central member 143 and the other end attached by a pin 146 to a disk shaped member 147. This pin 146 is spaced radially from the axis upon which the disk shaped member 147 is rotated. An electric motor 148 is provided for rotating the shaft 149 upon which the disk shaped member 147 is carried.

FIG. 10 is a schematic illustration of a modified form of the invention wherein the elongated fibers 102 are fed through a bath 150 including a mixture of resin and filler material such as ground up corn cobs. In one particular embodiment the resin material used for coating the elongated strands 102 is orthophthalic polyester resin mixed with ground up corn cobs which is capable of being retained on a 40 mesh screen and is allowed to pass through a 20 mesh screen. As the resinous material and corn cobs are adhered to the fiberglass strands 102 they are passed through a die 151 having holes therein for removing the excess resinous material therefrom. The coated strands are then passed under heating lamps 153 for producing a stage B (partial curing) of the resinous material. The partially cured resinous material and corn cobs adhere to the elongated strands and produce a rough and uneven surface on the strands which enhances the bonding of the mixture being fed by hopper B to the elongated strands. The elongated strands then pass through a die 152 to be oriented similar to the die 131 as shown in FIG. 3.

FIG. 8 shows diagramatically the elongated strands 102 provided in an artificial board 49 having the uneven or texturized surface produced by the corn cobs mixed with resinous material.

FIG. 9 illustrates still another modified form of the invention wherein the fiberglass strands 102a are crimped by any suitable means such as heated crimping rolls to produce an undulated wave form therein. These fiberglass strands are then fed into the apparatus shown in FIGS. 1 through 4 to be mixed with the mixture. Of course the tension must be reduced when utilizing undulated fiberglass strands so that the undulations will remain therein as the compressing operation takes place.

The elongated board produced by the method and apparatus described above have a substantially uniform density about its length produced by compressing the mixture with elongated rotating belts. The core of the elongated board has a density less than the density of the outer layers. As a result of producing the board with its outer layers having a uniform density about its length, the overall strength of the board has a higher strength rating than if it were produced by joining compressed segments such as the case inherent in ram extrusion.

While a preferred embodiment of the invention has been disclosed it is to be understood that the apparatus may be used for compressing any suitable mixture of materials that is capable of being bonded with resinous materials and cured.

What is claimed is:

1. An elongated board of artificial lumber having a length much greater than the width and thickness and being of a predetermined thickness comprising: a homogeneous mixture of ligneous wood fibers and a cured thermosetting resin, a plurality of spaced elongated reinforcing strands extending the length of said board, said fibers and said resin on opposite sides of said board being compressed to said predetermined thickness and densified by having been heated and compressed under pressure while being held at said predetermined thickness defining smooth continuous outer layers having a substantially uniform density about the length of said board, a continuous core extending the length of said board having a density less than said outer layers, and said homogeneous mixture of fibers and resin forming a bond around said elongated reinforcing strand affording longitudinal and transverse strength to said board.

2. The elongated board of artificial lumber as set forth in claim 1 wherein said elongated reinforcing members extending through said elongated board have an undulated configuration.

3. The elongated board of artificial lumber as set forth in claim 1, wherein said elongated reinforcing strands are fiberglass strands.

4. The elongated board of artificial lumber as set forth in claim 1, wherein said elongated reinforcing strands are under tension.

5. The elongated board of artificial lumber as set forth in claim 1 further comprising: a textured coating carried on said elongated reinforcing members producing an uneven surface for enhancing bonding of said fibers and resin to said elongated reinforcing strands.

6. An elongated board of artificial lumber having a length much greater than the width and thickness comprising: a homogeneous mixture of ligneous wood fibers and a cured thermosetting resin, a plurality of spaced elongated reinforcing strands extending the length of said board, said fibers and said resin on all sides of said board being compressed and densified by having been compressed under pressure defining smooth continuous outer layers on all sides having a substantially uniform density about the length of said board, a continuous core extending the length of said board having a density less than said outer layers, and said homogeneous mixture of fibers and resin forming a bond around said elogated reinforcing strands affording longitudinal and transverse strength to said board.

* * * * *